US008678586B2

(12) United States Patent
Mandler

(10) Patent No.: US 8,678,586 B2
(45) Date of Patent: Mar. 25, 2014

(54) METHOD FOR PRODUCING COST-OPTIMIZED SPECTACLE LENSES WITH ESPECIALLY ADVANTAGEOUS PROPERTIES FOR THE USER

(75) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 0 days.

(21) Appl. No.: 13/226,702

(22) Filed: Sep. 7, 2011

(65) Prior Publication Data
US 2012/0057123 A1 Mar. 8, 2012

(30) Foreign Application Priority Data
Sep. 8, 2010 (DE) .......................... 10 2010 037 400

(51) Int. Cl.
*G02C 7/02* (2006.01)
(52) U.S. Cl.
CPC ....................................... *G02C 7/024* (2013.01)
USPC ............... 351/159.74; 351/159.8; 351/159.42
(58) Field of Classification Search
USPC ......... 359/159.73–78, 159.8; 351/159.73–78, 351/159.8
See application file for complete search history.

(56) References Cited

U.S. PATENT DOCUMENTS

| 4,484,804 | A | | 11/1984 | Mignen | |
|---|---|---|---|---|---|
| 5,054,904 | A | * | 10/1991 | Bristol | ........................... 348/520 |
| 2010/0201941 | A1 | * | 8/2010 | Gupta et al. | .................. 351/169 |
| 2010/0283965 | A1 | * | 11/2010 | Dubois et al. | ................. 351/177 |
| 2011/0157547 | A1 | * | 6/2011 | Dillon et al. | .................. 351/177 |

FOREIGN PATENT DOCUMENTS

| DE | 1 115 609 | 10/1961 |
|---|---|---|
| DE | 1 422 125 | 9/1969 |
| DE | 197 01 312 | 7/1998 |
| DE | 101 03 113 | 8/2002 |
| EP | 0 744 646 | 11/1996 |
| EP | 1 990 676 | 11/2008 |

\* cited by examiner

*Primary Examiner* — Scott J Sugarman
*Assistant Examiner* — Robert E Tallman
(74) *Attorney, Agent, or Firm* — Clark & Brody

(57) ABSTRACT

A method for producing spectacle lenses from raw lenses prefabricated in a non-cutting manner uses raw lenses having a central geometric axis standing vertically on them. The lens comprises a convex front side that is formed in a rotationally symmetrical manner about the central axis and is not to be reworked and an opposing back side that is to be reworked with a CNC machine. The front- and back side have at least one optical focal point in common. In order to rework the back side a prescription surface is calculated on the basis of a prescription and of the geometry of the front side. This surface forms a prescription lens in common with the front side, the focal points of which lens correct the visual error of the prescription holder. A spectacle lens with an optical center is produced from the prescription lens for use in an eyeglass frame.

13 Claims, 7 Drawing Sheets

METHOD FOR PRODUCING COST-OPTIMIZED SPECTACLE LENSES WITH ESPECIALLY ADVANTAGEOUS PROPERTIES FOR THE USER

FIELD OF THE INVENTION

The invention relates to a method of making a prescription lens that provides improvements in the quality and cost of making eyeglasses using the prescription lens.

BACKGROUND ART

The invention relates according to the generic part of claim 1 to a method for producing spectacle lenses from raw lenses prefabricated in a non-cutting manner. The raw lenses have a central axis standing vertically on them and comprise a convex front side that is formed in a rotationally symmetrical manner about the central axis and is not to be reworked and comprises an opposing back side that is to be reworked with a CNC machine. The central axis is a purely geometric axis and is not actually physically present. Front- and back side have at least one optical focal point in common. Furthermore, a prescription describes a visual error of a prescription holder. In order to rework the back side a prescription surface is calculated on the basis of the prescription and of the geometry of the front side. This surface forms a prescription lens in common with the front side, the focal points of which lens correct the visual error of the prescription holder. A spectacle lens with an optical center is produced from the prescription lens by adaptation to an eyeglass frame through which an eyeglasses wearer looks when looking straight ahead. This view looking straight ahead is also designated as the zero view direction.

Spectacle lenses serve as a visual aid and are available in many forms. Two spectacle lenses are customarily connected by a frame and form eyeglasses in common with it that can be positioned in front of two eyes in such a manner that one spectacle lens is arranged in front of each eye.

The function of a spectacle lens is based on the physical properties of an optical lens. A prerequisite is an optically transparent material. A front side and back side of the lens are manufactured in such a manner, in particular ground, that they form at least one optical focal point by convex and concave shaping. The determination of the focal point of the lens takes place as a function of a visual error of a person that is ideally compensated with the aid of the lens, during which in particular the erroneous natural focal point of the eye is corrected by the lens.

It can be necessary, especially for correcting presbyopia, that the lens must have several focal points. Depending on the distance of an object to the eye, the eye lens curves with differing strengths. In presbyopia this elasticity is limited - the eye lens hardens and thickens. This has the result that the visual error of the eye is different in the case of objects at a short distance to the eye (close vision) and the visual error in the case of remote objects (far vision). In order to be able to see objects sharply at all distances from the eye, the focal point of the eye must be corrected in accordance with the distance of the object from the eye by a certain focal point of the lens. The closest and classic solution is to change to a lens or to eyeglasses with a different focal point according to the distance of the object from the eye. However, it is also possible to shape the lens in such a manner that it has several focal points in different zones of the lens. It is possible by means of such a design that no changing of the lens is necessary and instead, by changing the direction of the view the zone of the lens is changed.

If a lens has two different focal points, as a rule one for the far vision range and one for the close vision range in the lower area of the spectacle lens, the lens is designated as a bifocal lens. Such glasses can usually be recognized by a visible transition between the two areas. To the extent that the focal point in a change of the angle of view, in particular from above downward, is frequently a different one, one speaks of a multifocal lens, where the focal point can also continuously be a different one.

Different methods are used to manufacture spectacle lenses. In the simplest case spectacle lenses are manufactured from flat blanks in several work steps. These blanks are plane disks of silicate glass or plastic. At first, in this method the desired geometries of the optical surfaces are produced on both sides of the lens by mechanical working (turning, milling, grinding), whereby the produced surfaces have a great surface roughness and are therefore optically non-transparent. Therefore, the machining is followed by a polishing process in which the surface roughness of the surfaces is decreased to such an extent that light is no longer inadmissibly scattered and the lens is therefore transparent.

Economical standard eyeglasses generally have standardized lenses today. At first, circular lenses are produced by casting or injection molding. The quality of such lens surfaces is so great that no further reworking of the surface is necessary. Only the contour must be adapted to a provided eyeglasses frame. Such changes have as a rule a spherical front side as well as a spherical back side. The term "spherical" denotes that the surface is a section of a sphere and that all points on the surface are at a distance radius R from a sphere middle point. Lenses with this type of construction have a few disadvantages. These standardized lenses are extremely economical to acquire but usually do not satisfy the desires for sharpness of vision in the near- and the far areas both over the entire angle of view from top to bottom and from left to right.

In order to reduce this deficiency of quality, more expensive spectacle lenses are usually individualized in that the eyes are measured and the calculation is made how a lens must be constructed in order to optimally eliminate an existing vision error. The result of the calculation is usually documented by an optician or eye doctor and transmitted in the form of a prescription to the person who manufactures the lens. Therefore, in the following a lens individualized according to prescription is designated as a prescription lens.

In order to produce prescription lenses different methods can be considered. For economic reasons in particular, methods have become popular that individually rework a raw lens manufactured on an industrial scale by non-cutting methods and polishing. Raw lenses of plastic are produced as a rule by casting or injection molding and raw lenses of silica glass are produced by lowering heated glass disks in forms. The quality of such lens surfaces, in particular the front side and the back side, is so high that basically no further reworking of the surface would be necessary. However, such a lens has one or more standardized focal points that frequently do not optimally correct the visual error of a certain eye. Therefore, the raw lens or partial areas of it, for example, only one side are individually adapted by reworking to the visual error of the certain eye. For this, a removal of material for shaping the prescription lens is calculated based on the front-side surface and back-side surface of the raw lens and of a prescription. The parameters of the surface geometry of the raw lens are obligatorily required for this calculation. A reworking on the front side and the back or only on one side can subsequently take place. A one-sided reworking generally results in lesser manufacturing costs than a two-sided one since the reworking expense is less. If the site is individualized by reworking, it is a so-called prescription surface.

The reworking takes place today with modern CNC milling machines, so that even complicated surface shapings can be realized. The reworking of a raw lens is, however, limited in that the stability of the lens must remain preserved and also the radii of curvature and the material strength of the raw lenses must impose limits to the changes. Therefore, at least a certain number of different types of raw lenses is required in order to be able to manufacture lenses for the largest possible visual error span. Lenses for rare and extremely strong visual errors that do not fall within this span must be manufactured by other production methods, for example, by production from a material block.

A production of individualized spectacle lenses from raw lenses is described, among others, in EP 0 744 646 A1. Different types of raw lenses are used in which one side surface has already been completed. They are produced by a casting- or injection molding process in which the front side of the raw lens is formed convexly and spherically. The prescription surface is calculated on the basis of a prescription issued by an eye doctor and subsequently manufactured by machining and polishing. It can be spherical, toric or multifocal. The desired optical properties of the spectacle lenses finally result in combinations of the standardized spherical front side and of the prescription side and correspond to the given prescription.

However, significant disadvantages result from a prescription manufacture according to EP 0 744 646 A1. As a result of the spherical front side the back-side prescription surface is very flat in the lower spectacle lens area that should correct the visual error in the close vision range. Even convex curvatures can be required on the back side of the spectacle lens in order to eliminate the visual error. Wearers of the eyeglasses perceive this as being extremely unpleasant and disturbing. In particular, this leads to another optical error: The more obliquely an eyeglasses wearer looks on the back-side surface of the lens, the greater the prismatic effect of the lens. This causes distortions since light of different wavelengths is refracted with different strengths. The back-side surface of the lens should accordingly be shaped in such a manner that the lens surface stands vertically to it in every direction of viewing. That is, the back side of the lens must be concave. However, this central requirement is not met by EP 0 744 646 A1.

A production of individualized spectacle lenses is also described in DE 197 01 312 A1. It describes a raw lens that is reworked exclusively on the back side. That means that the prescription surface is on the back side of the lens. The front side, on the other hand, remains unchanged and has a spherical or an aspherical front side. An aspherical surface is characterized in that it can be described by a mathematical function according to DIN ISO 10110-12, whereby the radius continuously changes from the middle axis outward. The back side of the lens is calculated according to prescription as a multifocal freeform surface and is produced by reworking.

Even DE 101 03 113 A1 describes a rotationally symmetrical and in particular spherical front side of the lens without, however, explaining it further.

Furthermore, a raw lens is known from EP 1 990 676 A2 that is bisymmetrical and for which only the back side should be reworked. The front side of the raw lens is formed by two partial surfaces. Whereas the main surface is a sphere, a toric surface is arranged decentrally in the main surface. This toric surface has a lesser curvature than the main surface and should later be arranged in the lower area of the spectacle lens, in particular in the area of the spectacle lens that should correct the visual error in the close vision range. Toric surfaces and toric glasses serve not only to correct a shortsightedness or farsightedness but also to compensate a curvature of the cornea (astigmatism). This construction is more complicated. Toric glasses can be recognized in the prescription in that the strength is noted in three parts. The individual parts are designated sphere (sph), cylinder (cyl) and axis.

It is disadvantageous in EP 1 990 676 A2 that the prismatic effect is not taken into account in the horizontal direction. The blurs resulting from this in the viewing directions left and right and temporal and nasal, are disturbing not only for the wearer of the eyeglasses but rather even dangerous, e.g., in the case of a vehicle driver who looks back over his shoulder with such eyeglasses, for him and third parties. Wearers of eyeglasses frequently also suffer from nausea, headaches and feelings of dizziness on account of this blurriness.

Furthermore, the esthetics of the spectacle lenses is adversely affected since the transition from the spherical to the toric surface on the front side of the lens can be perceived in particular by reflections of light. Moreover, the bisymmetry requires a very precise rotational alignment of the raw lens in the tool before the working of the prescription surface can take place. If this does not happen, the worked surface is not at the location that results according to calculation in an optimal correction of the visual error. The lens would then be unusable.

DE 1 422 125 A teaches another shaping of the front side. This side has an aspherical and constantly changing surface. In particular, the asphere is described by an involute that is constructed with an evolute. Such an aspherical front side for spectacle lenses described by an involute is also described by DE 1 115 609 B. This involute is generated by an evolute composed of several pieces of circular arcs. Even in such a construction the surface of the front side of the raw lens constantly and continuously changes.

A further forming of the surface of a spectacle lens raw lens is described by US 4 484 804 A. Here, the surface is formed by two spheres with different radii. In particular, an area of the surface that should subsequently be in the close vision area of the spectacle lens is formed by a sphere with deviating radius. In order to prevent a visible edge in the transition between the first and the second asphere the transition is smoothed.

SUMMARY OF THE INVENTION

One of the objectives of the invention is to increase the economy and the quality during the manufacture of eyeglasses. In particular, a reduction of the prismatic effect in all of viewing directions is to be considered here. Care should be taken that stylistic requirements remain on the front side of the spectacle lens. Ideally, the number of different lens blanks should be limited in order to keep the storage costs low. The further disadvantages of the state of the art should be avoided.

The invention relates to a method for the production of spectacle lenses consisting of raw lenses prefabricated in a non-cutting manner that preferably consist of plastic or silicate glass and are preferably circular. The raw lenses have a central axis standing vertically on them and comprise a convex front side that is formed in a rotationally symmetrical manner about the central axis and is not to be reworked and comprises an opposing back side that is to be reworked with a CNC machine that have at least one optical focal point in common. The middle axis is a purely geometrical axis and is not actually physically present.

A prescription describes a visual error of the holder of a prescription. A prescription surface is calculated on the basis of the prescription and of the geometry of the front side for reworking the back side. This prescription surface forms, together with a front side, a prescription lens whose focal points correct the visual error of the prescription holder. A spectacle lens with an optical center through which a wearer of eyeglasses looks when looking straight ahead (zero direction of looking) is manufactured from the prescription lens by adaptation to an eyeglass frame. The front side of the raw lens is formed as a first freeform surface that is composed from the middle axis outward of at least two spherical sections with different radii, whereby the spherical sections border tangentially on each other in a spherical transition. In addition, the prescription lens is adapted to the eyeglass frame in such a manner that the middle axis of the raw lens lies outside of the optical center of the spectacle lenses.

The tangential bordering on each other of the spherical transitions means that the tangents of the bordering spheres are equal at the point at which they touch each other. Thus, there are no breaks on the front side and each point on the back side can be mathematically differentiated. That is, each point of the front side has only one normal level vector. A start is to be made here from a macroscopic surface and not from a microscopic one.

The raw lenses are as a rule circular. The outer edge of the raw lens can, however, also be a section from a round lens that has a form differing from the circular form. The outer blank is not important, what is decisive is whether a non-circular lens can be obtained as a section of a circular lens in accordance with the invention. It could, for example, be advantageous if the raw lenses have a square form if most of the spectacle lenses purchased are also square on account of a stylish trend. This would reduce the waste resulting from the adaptation of the raw lens or prescription lens to the eyeglass frame.

The raw lenses are preferably flat blanks of silicate glass or plastic. Raw blanks of plastic could be produced by casting or injection molding and raw blanks of silicate glass by lowering heated glass disks into forms. The quality of the raw lens surface should be so great here that basically no further reworking of the front and back side is necessary. In this manner the raw lens can be adapted to an eyeglass frame even without reworking the front and the back side and utilized by a person with a visual error to correct it. If a special eyeglasses type is particularly in demand, it is also possible to shape the outer geometry of the raw lenses in such a manner that the raw lenses can be inserted into an eyeglass frame without any reworking. In such an instance a special tool for a standard spectacle lens would be involved whose basic shape, however, corresponds to the raw lens of the invention.

However, in order to optimally eliminate a visual error an individualization of the raw lens according to prescription by a reworking of the entire raw lens or of partial areas of the raw lens can be necessary. A prescription is a source of all information about a visual error. It does not have to be a written document of a physician or of an optician. The removal of material for shaping the prescription surface can be calculated based on the front- side and back-side surfaces of the raw lenses. The parameters of the surface geometry of the front side and the back side of the raw lens are obligatorily required for this calculation. A reworking of the back side to the prescription surface can subsequently take place. A one-sided reworking generally generates lesser manufacturing costs than a two-sided one.

The reworking of the back side takes place with modern CNC machines. At first, the prescription surface is produced by mechanical working (turning, milling, grinding). Since a surface produced in this manner generally has too great a surface roughness it is optically non-transparent. Therefore, the machining is generally followed by a polishing process in which the surface roughness of the surfaces is decreased to such an extent that light is no longer inadmissibly scattered and the lens is therefore transparent.

After the reworking of the back side to a prescription surface, only the contour of the prescription lens remains to be adapted to a provided eyeglass frame. However, this work step could also take place before or during the working of the back side. There is also the possibility of working the front side, if necessary. This could be necessary in the case of special visual errors or, however, in order to polish out small scratches that could arise, among other things, during the different work steps. Basically, however, a reworking of the front side should be avoided since this means an increased work expense.

Special advantages of the invention result from the geometry of the front side of the raw lens. As a result of the surface of the front side, which is rotationally symmetric about the middle axis, no angular alignment in the direction of rotation in the tool prior to the reworking of the raw lens is necessary. Regardless of at what angle about the axis of rotation the raw lens is arranged to the tool for a reworking, the geometry of the prescription lens produced is the same after the reworking. Only the middle axis of the raw lens must be brought into a defined position. After the use of the tool the prepared prescription surface is located at the site that leads according to calculation to an optimal correction of the visual error. Thus, no constructive measures are necessary for making possible the alignment in the direction of rotation.

No notching on the edge of the raw lens for alignment in a special tool is necessary in a rotationally symmetrical raw lens. Thus, according to the invention no manual alignment in the direction of rotation is necessary and the danger that the prescription surface could be arranged rotated toward the front side is excluded and the waste is therefore low. As a result, the economy of the method in accordance with the invention is high.

Moreover, an area in which a notch is located could not be a component of the later spectacle lens. Accordingly, an edge would have to be planed and the reworking would have to be shaped correspondingly larger. The raw lens of the invention requires no notch and therefore contributes to the fact that the raw lens can be designed small and thus causes little expense for production, storage and transport. In addition, it contributes to the protection of the environment.

The raw lenses in accordance with the invention can also be received by already existing tool receptacles. This is especially important since the storing of special tools could be a barrier to growth in the company since not every optician would like to have special tools for every type of raw lens at the ready. Since no special tool is necessary, the chance of being able to gain a large share of the market is great.

The arranging of at least two different spheres on the front side is especially advantageous. A bifocal spectacle lens can be produced in the case of exactly two different spheres the front side of which does not have to be worked and in which the raw lens is nevertheless rotationally symmetrical. To this end each sphere has a different focal point. Thus, a regular changing of the eyeglasses for different activities can be avoided.

As result of the fact that bordering spheres are arranged tangentially to each other in a sphere transition so that the tangents of the bordering spherical sections are the same in the sphere transition ensures a harmonious transition between two spheres, which is perceived as pleasant by the wearer of the eyeglasses when wearing the seeing aid. In addition, this also has aesthetic advantages because there are consequently no edges present on the front side of a spectacle lens produced in this manner on which light could abruptly and differently refract. On the whole, the spectacle lens also receives a dynamic, sporty character by the arrangement of the spheres. Such a spectacle lens looks harmonious to external observers. Furthermore, an optically advantageous shaping of the spectacle lens is also achieved. This has economic advantages since in this manner a greater spectrum of different forms of eyeglass frames can be used.

The number of spheres that can form the front side together can be selected as desired so that even varifocal spectacle lenses can be manufactured. The rotational symmetry can be preserved at each number of spheres.

Since the front side of the raw lens already has at least two spheres, it is also not necessary to achieve the different focal points for eliminating a visual error exclusively by working the back side. As a result, the raw lenses as well as the spectacle lenses can be formed distinctly thinner, which considerably increases the wearing comfort and also does justice to high esthetic demands. In addition, the removal of material is less since the raw lens is already closer to the final result of the spectacle lens than, for example, a simple spherical raw lens is. At the same time, material is again saved, which reduces the costs of manufacturing, storing and transporting and in addition contributes to protecting the environment.

It can be ensured by the arrangement of spheres with different radii as well as the diverging of the middle axis of the raw lens and of the zero view direction of the spectacle lens that the prismatic effect is reduced in the horizontal and in the vertical direction. The blurs in the edge area of the spectacle lens are distinctly reduced by the back side corresponding to the front side since no flat or convex geometries, in particular also in the close vision area of the spectacle lens, are necessary on the back side. The prescription surface of the lens corresponds in such a manner to the front side that it is always concave and the prismatic effect is clearly reduced in all viewing directions. This results in a high wearing comfort since nausea, headaches and feelings of dizziness resulting from the blurs are avoided. In addition, objects can be recognized in a larger viewing angle for the eyeglass wearer, so that there is great safety.

In an embodiment of the invention the back side of the raw lens is shaped such a manner that is spherical or aspherical. A spherical shape requires less calculating expense.

An aspherical back side represents an improvement to spherical back side. This requires a greater calculating cost but results in a raw lens whose geometry is clearly closer to the spectacle lens to be manufactured. This considerably reduces the thickness of the raw lens and less material is used. In addition, the removal of material is reduced for arriving at the final result of the prescription lens. This reduces the expenses of manufacturing, storing and transporting and in addition contributes to the protection of the environment.

However, the back side of the raw lens is ideally shaped in such a manner that is a concave and rotationally symmetric, second freeform surface which is composed from the middle axis outward by at least two spherical sections with different radii and that the spherical sections border each other tangentially in a sphere transition.

In this manner it is possible to design the back side to the geometry of the front side in the raw lens already. Such a raw lens can be used already without reworking of the front side and back side as spectacle lens to the extent that a visual error is eliminated in this manner. The necessary removal of material for arriving at a final spectacle lens is reduced again in comparison to an aspherical back side.

This achieves minimal expenses of manufacturing, storing and transporting and contributes maximally to the protection of the environment.

If such a raw lens as section of a round raw lens is cast, for example, directly into an appropriate form, the raw lens can also be used directly as a standard spectacle lens. Preferably, the spherical section of the front side, that is arranged closer to the middle axis, has a greater radius than a spherical section of the front side at a greater distance from the middle axis. As a result, the curvature of the raw lens increases with increasing distance from the middle axis. This has advantages regarding the esthetics and also the blurriness in the edge area can be reduced in this manner since no convex and flat areas are necessary in the prescription surface, which corresponds to the front side.

The back side ideally follows the front side in that the spherical section of the back side that is arranged closer to the middle axis has a greater radius than a spherical section of the back side at a greater distance from the middle axis. Therefore, the geometry of the raw lens is as close as possible to the final result of the prescription lens. As a result the reworking expense is reduced since less removal of material is required for manufacturing the prescription surface.

An embodiment of the invention provides that a smoothing takes place on at least one transition of spherical sections bordering on each other. After the smoothing, each point on the front side and/or the back side can be mathematically differentiated. That is, each point on the front side and the back side has only a single normal plane vector. A start is to be made here in the geometry of the front side and/or of the back side from the macroscopic surface but not, for example, from a microscopic, crystallographic surface. The smoothed transition is not spherical but the smoothed transition borders tangentially on the spherical sections bordering on it. It is assured in this manner that no hard transitions are present from one focal point to another. This increases the wearing comfort. Moreover, no breaks are present in the surface so that the raw lens and the spectacle lens obtained from it meet the highest aesthetic and optical demands.

Furthermore, the front side and the back side should be shaped in such a manner that they together form at least one bifocal raw lens, but preferably a multifocal raw lens. This ensures that the raw lens already has suitable and functional optical properties. It can thus already be used without reworking if this should be desired. Even economical, standardized spectacle lenses can be offered in this manner that can be sufficient for numerous users.

It is especially advantageous if the prescription surface is shaped substantially concavely, whereby the prescription surface can be spherical and/or aspherical and/or atoric and/or toric but it is preferably a prescription freeform surface. The shaping of the prescription surface is in accordance with the data of the prescription but it can also take on known forms, for example, a simple sphere, a calculatable asphere, an atoric or toric form. Toric spectacle lenses serve not only to correct a shortsightedness or farsightedness but also to compensate a curvature of the cornea (astigmatism). The geometry of a torically bent surface has curvatures that are different in two main sections. In an atoric form the surface in each meridian would be differently curved. Such prescription surfaces would already be complex.

However, ideally a prescription freeform surface is calculated in such a manner on the basis of the front side and of the prescription that all visual errors are corrected in every viewing angle of the spectacle lens. The prescription freeform surface then has an indefinable and arbitrary geometry. As a consequence, a maximal correction of the visual error of prescription holder is achieved.

However, limits are imposed on the form of the prescription freeform surface since the removal of material from the raw lens is limited since spectacle lenses that are too thin can not meet existing requirements for a sufficient stability. Moreover, the prescription freeform surface must lie within the raw lens since material can be exclusively removed but can not be added.

Furthermore, the invention can provide that the front side and the prescription surface are shaped in such a manner that they together form, after the adaptation of the prescription lens to an eyeglass frame, at least one bifocal spectacle lens, but preferably a multifocal spectacle lens. Multifocal spectacle lenses are much in demand by current eyeglass wearers. This is due in particular to a greater visual comfort without a hard transition that makes an improved correction of the visual error possible at different distances of objects from the eye.

The front side comprises several spheres, as a result of which the prescription surface can essentially be shaped in such a manner that an eyeglass wearer looks at it as vertically as possible in every angle of view. Ideally, the normal plane vectors of the prescription surface would lie in every direction of view on an axis with the latter. The eyeglass wearer would accordingly always look vertically onto the glass surface. However, the prescription surface is primarily based on the prescription data. In order to nevertheless meet the requirement of the vertical angle of view, the front side must therefore already be shaped in such a manner that the corresponding back side meets this requirement. The arrangement of several spheres on the front side helps here and at the same time the front side must not be formed in such a manner that it no longer meets the aesthetic requirements.

An especially advantageous embodiment of the invention provides that the middle axis lies in the nasal direction of the optical center. However, the middle axis should still be a component of the spectacle lens. This makes it possible to produce the spectacle lens not from the center of the raw lens but rather in an orientation in the direction of the edge. In particular, sport glasses or sport-like glasses have eyeglass frames that are shaped rather flat in the nasal direction, i.e. the direction to the nose and follow the shape of the head in the temporal direction, i.e. in the direction of the temple by an augmented curvature. The invention makes it possible to manufacture high-quality spectacle lenses for these eyeglass frames in that the temporal area of the spectacle lens is shifted further into the edge area of the raw lens and the nasal area of the spectacle lens into the center.

Furthermore, the middle axis of the raw lens can lie above the optical center of the spectacle lens. The curvature of the spectacle lens accordingly increases more strongly in the direction of the lower spectacle lens edge than in the direction of the upper spectacle lens edge.

As a result of the diverging of the zero view direction and of the middle axis of the raw lens it is achieved in addition to a sporty, dynamic spectacle lens esthetics that the prescription surface can be aligned in all directions of viewing vertically to the direction of viewing of an eyeglass wearer. This reduces distortions that occur in a non-vertical arrangement of the direction of viewing to the back side of the spectacle lens by the prismatic spitting of the light into its spectral colors. The reduced distortion results in great wearing comfort since nausea, headaches and feelings of dizziness resulting from the blurriness are avoided. In addition, objects can be recognized in a greater viewing angle by the eyeglasses wearer so that there is great safety.

In order to be able to manufacture the thinnest possible spectacle lenses as economically and rapidly as possible, several different raw lenses should be manufactured in the method that have different total curvatures on the front side and on the back side. The front side and the back side form at least one focal point here that can be changed only to a limited extent by a reworking of the back side to a prescription surface, whereby the total curvatures of the different raw lenses are staggered in such a manner that suitably staggered raw lenses are available for all typical spectacle lenses. However, care must also be taken that the working time for preparing a prescription lens drops with a rising number of different raw lenses but on the other hand the costs for storage and logistics rise.

In an alternative embodiment of the method the staggering of the raw lenses is designed in such a manner that the total volume of a spectacle lens is minimized after the working of the back side. This results in a thin spectacle lens with low weight. The wearing comfort is therefore great and even high esthetic demands are satisfied.

Furthermore, the staggering of the raw lenses could be designed in such a manner that the reworking time of the back side is minimized in that the removal of material in the manufacturing of the prescription surface is as little as possible. This results in shorter reworking times, which lowers the manufacturing cost for a spectacle lens.

A tool receptacle for receiving the raw lens in a CNC machine can optionally be manufactured for the method. A tool receptacle surface could be designed in such a manner that it is a negative image of the front side of a raw lens. In this manner the raw lenses in accordance with the invention could be received in an ideal manner by the CNC machines.

BRIEF DESCRIPTION OF THE DRAWINGS

Further features, details and advantages of the invention result from the text of the claims as well as from the following description of exemplary embodiments using the drawings, in which:

DETAILED DESCRIPTION OF THE INVENTION

Figure 1:
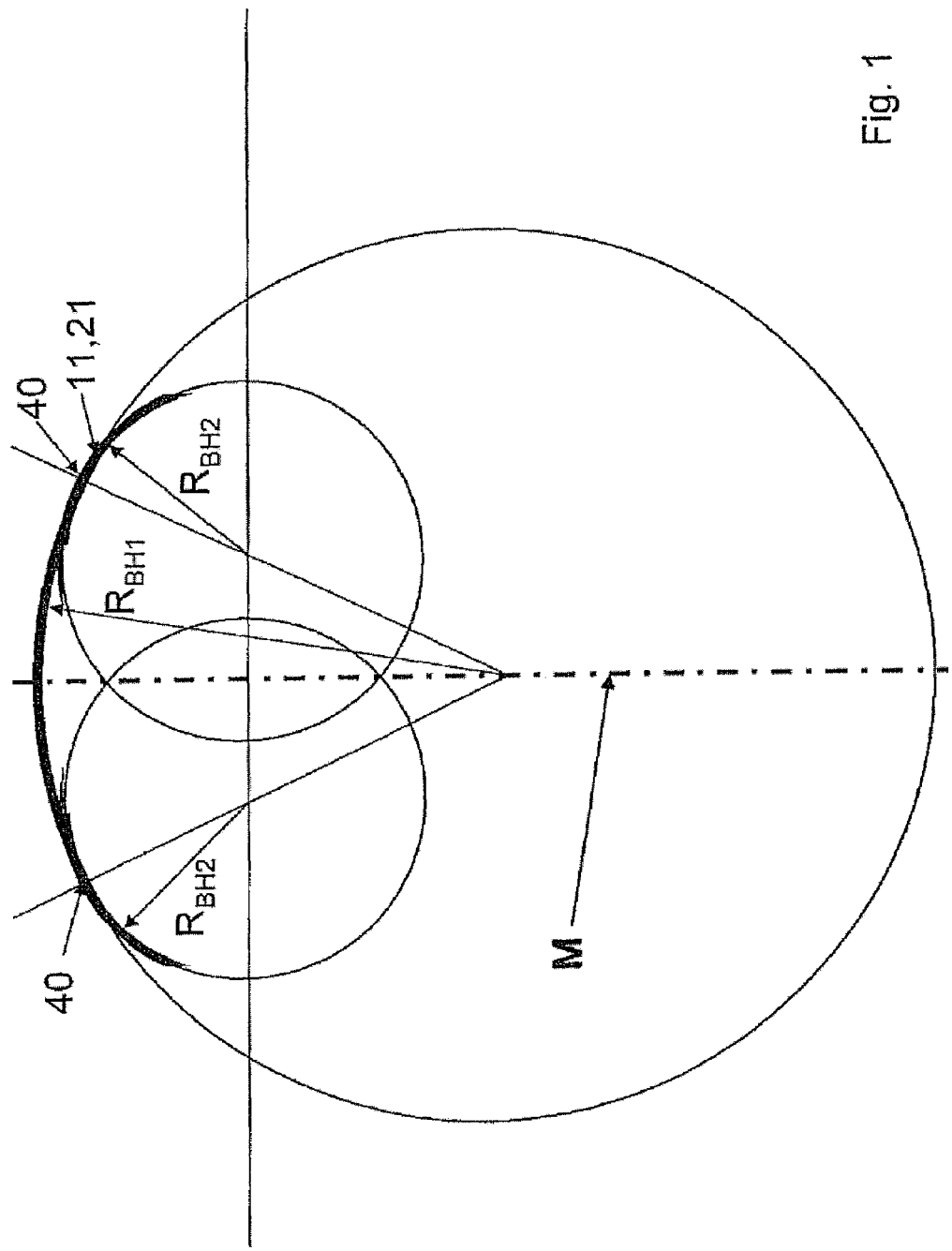
FIG. 1 shows a schematic construction of a front-side cross section consisting of two spherical sections that tangentially border on one another.

FIG. 1 shows a cross section through a front side 11 in accordance with the invention of a raw lens with a middle axis M. The front side is designed as freeform surface 21 in accordance with the invention that consists of two spherical sections tangentially bordering on one another in a sphere transition 40. The sphere located closer to the middle axis M has a radius $R_{BH1}$ and the sphere located further away from the middle axis M has a radius $R_{BH2}$, whereby the radius $R_{BH1}$ is larger than the radius $R_{BH2}$. The middle point of the radius $R_{BH1}$ is located on the middle axis M. The middle axis M represents an axis of symmetry for the section through the front side 11. In order to obtain the front side 11 as a surface, a rotation of the section through the front side 11 about the middle axis M should be carried out.

Figure 2:
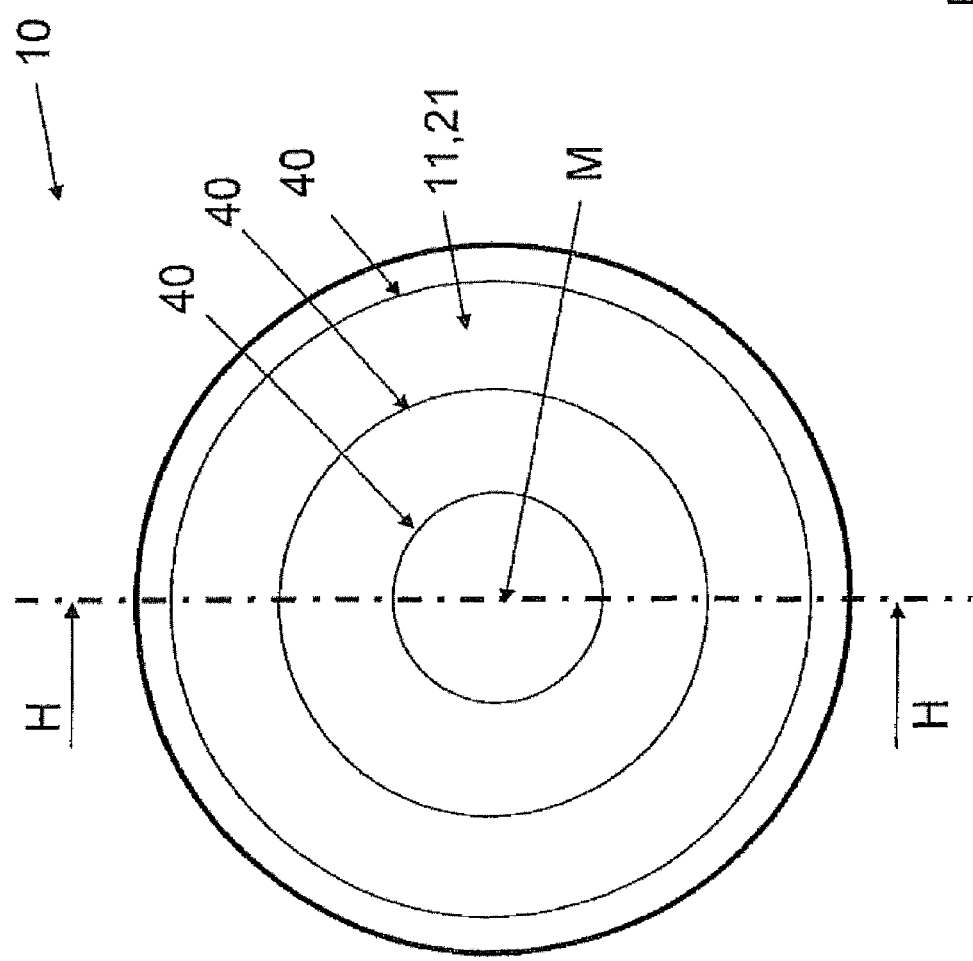
FIG. 2 shows a top view onto a circular raw lens with several spheres.
Figure 3:
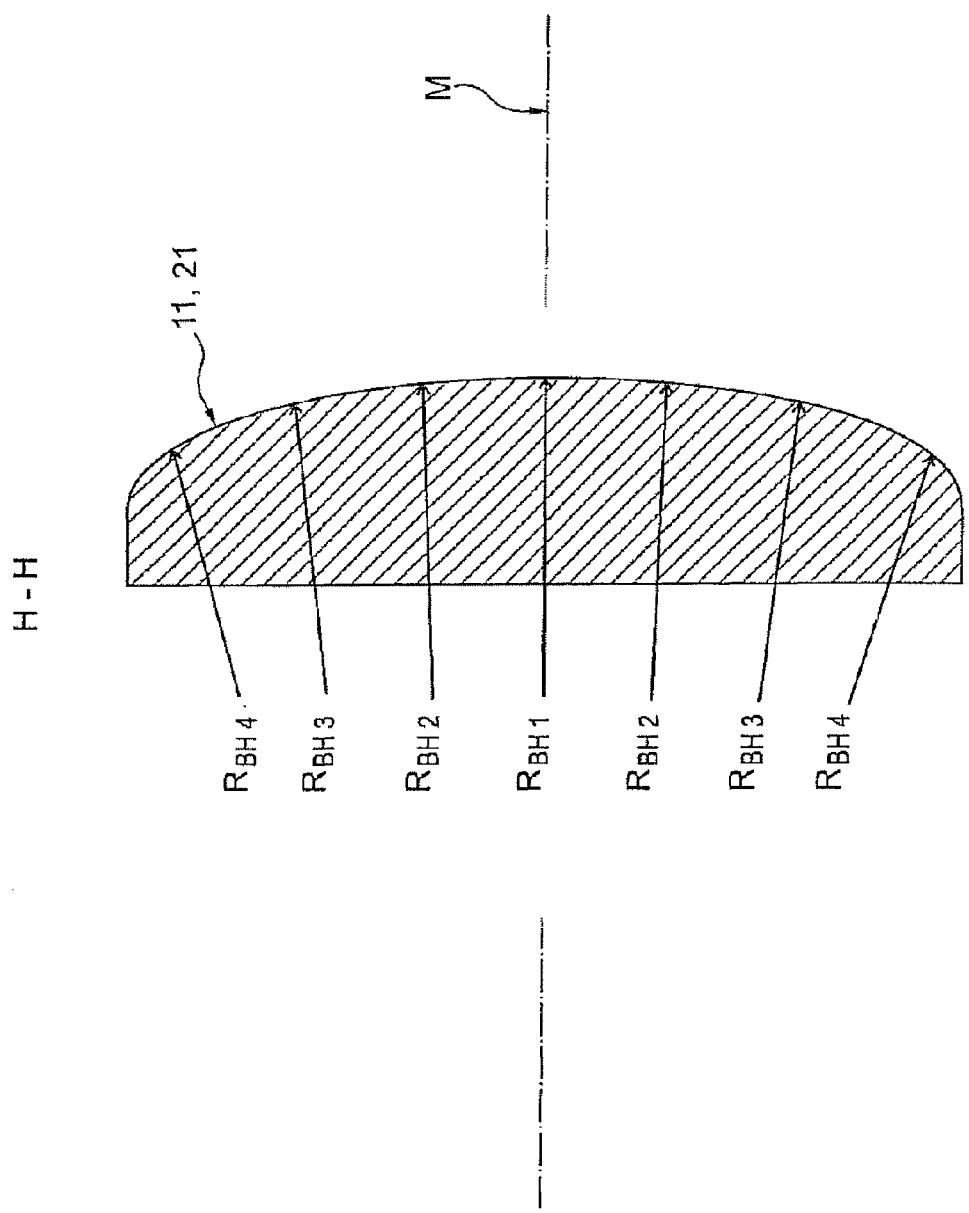
FIG. 3 shows a first freeform surface consisting of several spheres.

FIG. 2 shows a raw lens 10 in accordance with the invention in a top view from the direction of the middle axis M. A front side 11 is a freeform surface 21 and is composed of several spherical sections arranged in a rotationally symmetric manner about the middle axis M. Sphere transitions 40 show the boundaries between the sections comprising different sphere radii. Furthermore, a sectional plane H-H is characterized FIG. 3 shows a front side 11 in the sectional plane H-H that consists of a first freeform surface 21. The first freeform surface 21 is rotationally symmetric about a middle axis M and is composed of four spheres with different radii. The radius of the sphere that is a spherical section of the front side 11 located closer to the middle axis M is greater than the radius of the spherical section of the front side 11 that is further away from the middle axis M. That is, $R_{BH1} > R_{BH2} > R_{BH3} > R_{BH4}$.

Figure 4:
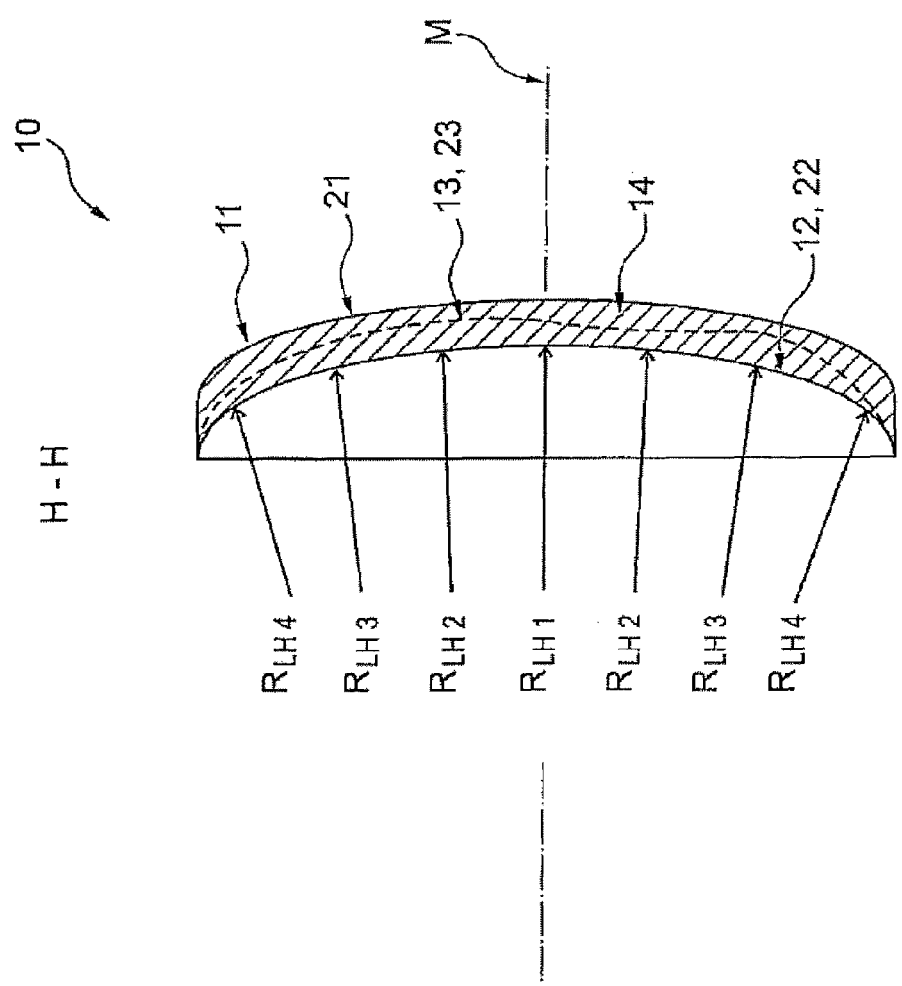
FIG. 4 shows a raw lens with a second freeform surface consisting of several spheres.

FIG. 4 shows a raw lens 10 with a front side 11 and a back side 12 in the sectional plane H-H. The front side 11 is a first freeform surface 21, is rotationally symmetric about a middle axis M and is composed of several spheres with different radii. The back side 12 consists of a second freeform surface 22, is rotationally symmetric about a middle axis M and is composed of four spheres with different radii. The radius of the spherical section of the back side 12, that is closer to the middle axis M, is greater than the radius of the spherical section of the back side 12 that is further away from the middle axis M. That is, $R_{LH1} > R_{LH2} > R_{LH3} > R_{LH4}$.

A prescription surface 13 can be produced by reworking the back side 12 by removing material from the second freeform surface 22. The calculation of the material removal is especially important since the feed depth of a tool, e.g., that of a CNC milling tool, can only be taken into consideration in this manner. This consideration of the feed depth prevents tool damage and workpiece damage and increases the quality, in particular the surface quality, of the worked surface. In particular, the shown prescription surface 13 is a prescription freeform surface 23. This surface is not rotationally symmetric. The remaining volume of the raw lens 10 between the prescription freeform surface 23 and the first freeform surface 21 results in a prescription lens 14.

Figure 5:
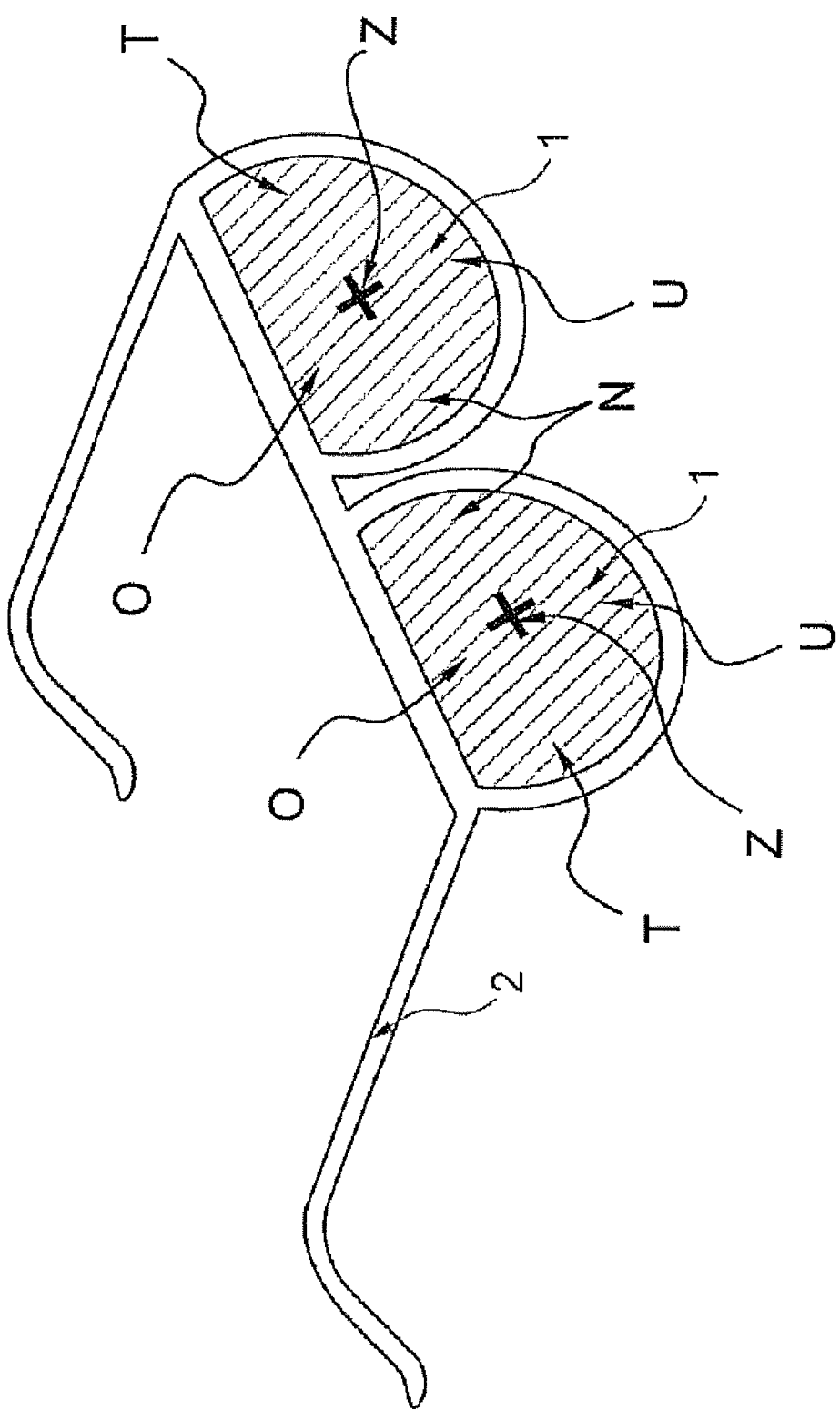
FIG. 5 shows an eyeglass frame with two spectacle lenses.

FIG. 5 shows a pair of eyeglasses consisting of an eyeglass frame 2 and two spectacle lenses 1. The spectacle lenses 1 have an alignment relative to a eyeglass wearer (not shown), whereby one area of the spectacle lens 1 is arranged at the top O, one at the bottom U, one nasally N and one temporally T. When an eyeglass wearer is looking straight ahead (zero viewing direction), he is looking through an optical center Z of the spectacle lens 1.

Figure 6:
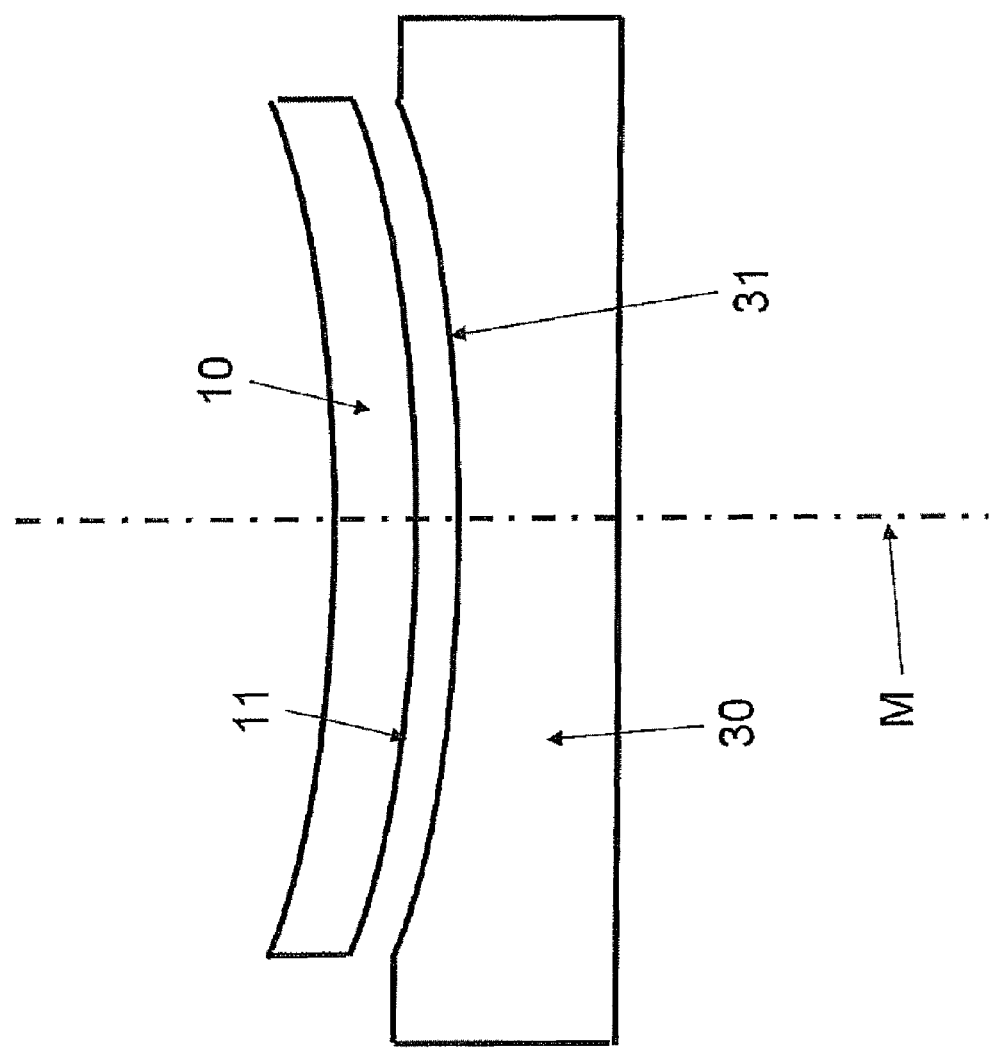
FIG. 6 shows a tool receptacle with a raw lens.

FIG. 6 shows a tool receptacle 30 for a raw lens 10. The tool receptacle 30 has a tool receptacle surface 31 that is a negative form of the raw lens front side 11. A middle axis of the tool receptacle 30 coincides with the middle axis M of the raw lens 10 for the positioning of the raw lens 10 into the tool receptacle 30.

Figure 7:
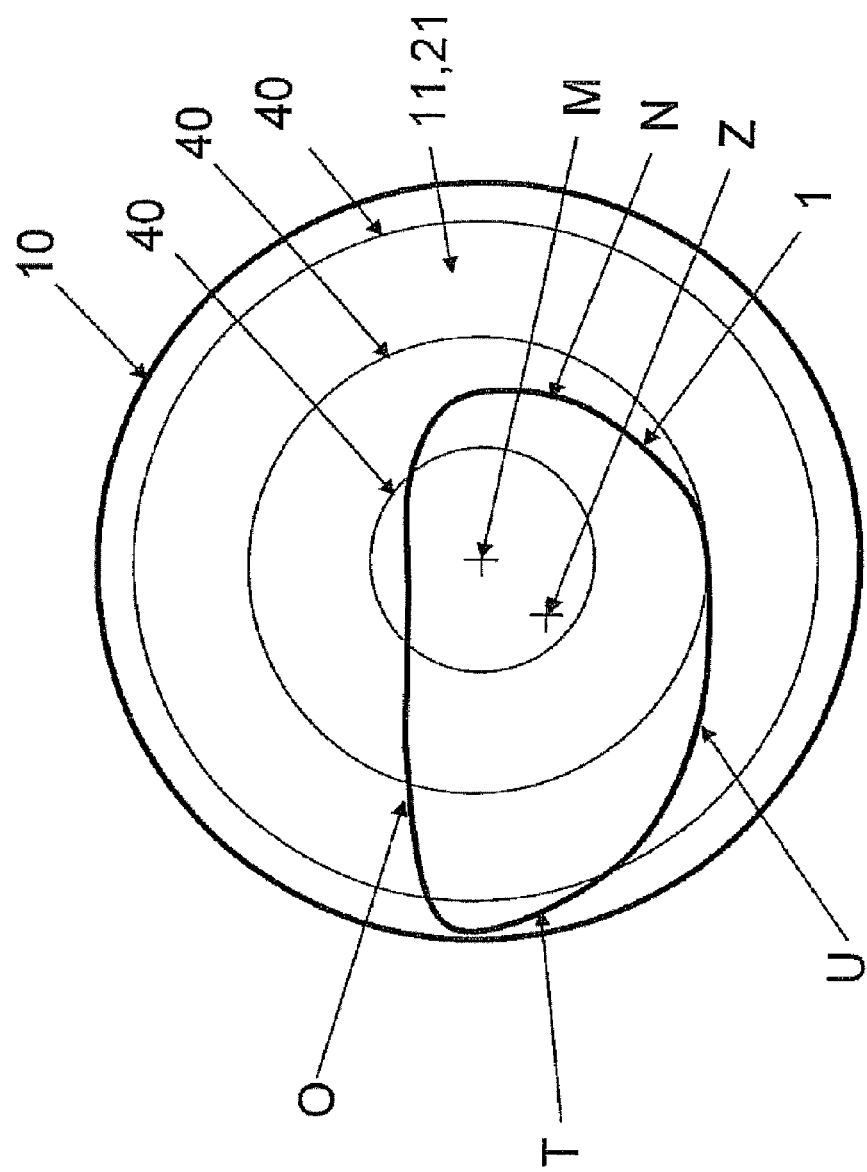
FIG. 7 shows a top view onto a circular raw lens with several spheres and the positioning of a spectacle lens in the raw lens.

FIG. 7 describes a raw lens 10 in accordance with the invention in a top view from the direction of the middle axis M. A front side 11 is formed as first freeform surface 21 and is composed of several spherical sections arranged in a rotationally symmetrical manner about the middle axis M. Sphere transitions 40 show the borders between the sections that have different sphere radii. It is furthermore shown from which area of the raw lens 10 a spectacle lens 1 is manufactured. The spectacle lens 1 has an alignment relative to the eyeglass wearer in a later eyeglass frame, whereby one area of the spectacle lens 1 is arranged at the top 0, one at the bottom U, one nasally N and one temporally T.

When the eyeglass wearer is looking straight ahead (zero viewing direction), he is looking through an optical center Z of the spectacle lens 1. This optical center Z does not coincide with the middle axis M of the raw lens 10. In particular, the middle axis M is arranged in the nasal direction N of the optical center Z. To the extent that the spherical sections have smaller sphere radii with increasing distance from the middle axis M, the curvature of the spectacle lens 1 increases in temporal direction T. Therefore, the spectacle lens 1 is relatively flat in nasal direction N, followed in temporal direction T by an increasing curvature of the head form of the eyeglass wearer in the direction of his temple.

In addition, the middle axis M is positioned in the direction toward the top O from the optical center Z of the spectacle lens 1. This has the consequence that the spectacle lens 1 is flatter above 0 than below U. The back side of the spectacle lens 1 can now be shaped in such a manner in particular in the lower U close vision area of the spectacle lens 1 that it is aligned concavely and as vertically as possible to the direction of view of the eyeglass wearer. This eliminates blurriness and distortions.

However, as can be recognized in FIG. 7, the middle axis M of the raw lens 10 is located only so far outside of the optical center Z of the spectacle lens 1 that this middle axis is still arranged in the area of the later spectacle lens 1.

The invention is not limited to one of the previously described embodiments but rather can be modified in many ways.

All features and advantages, including constructive details spatial arrangements and method steps proceeding from the claims, the specification, and the drawings, can be essential for the invention by themselves as well as in very varied combinations.

List of Reference Numerals 1 spectacle lens
2 eyeglass frame
10 raw lens
11 front side
12 back side
13 prescription surface
14 prescription lens
21 first freeform surface
22 second freeform surface
23 prescription freeform surface
30 tool receptacle
31 tool receptacle surface
40 sphere transmission
$R_{BH1}$-$R_{BHn}$ sphere radii of the first freeform surface
$R_{LH1}$-$R_{LHn}$ sphere radii of the second freeform surface
M middle axis of the raw lens
N nasal
O top
T temporal
U bottom
Z optical center of the spectacle lens

The invention claimed is:

1. A method for producing spectacle lenses (1) from raw lenses (10) prefabricated in a non-cutting manner; each of said raw lenses having a central axis (M) standing vertically on the raw lens (10), each of the raw lenses (10) comprising a convex front side (11), the front side formed in a rotationally symmetrical manner about the central axis (M) and is not to be reworked, the front side being formed as a first freeform surface, said first freeform surface being composed from a middle axis outward by at least two spherical sections with different radii, said spherical sections tangentially bordering on one another in a sphere transition, each of said spherical sections of the front side, which is arranged close to the middle axis, having a greater spherical radius than every spherical section on the front side at a greater distance from the middle axis, the raw lenses comprising an opposing back side (12) that is to be reworked with a CNC machine, said front side and opposing back side having in common at least one optical focal point; the method comprising the steps of:

calculating a prescription surface (13) in order to work the opposing back side, the prescription surface being calculated on a basis of a prescription of prescription holder that describes a visual error, and the prescription surface being calculated in such a manner that the reworked back side (12) forms together with the front side (11) a prescription lens (14), and focal points of the prescription lens that correct the visual error of the prescription holder;

manufacturing a spectacle glass (1) with an optical center (Z) through which an eyeglasses wearer looks when looking straight ahead (zero view direction) from the prescription lens (14) by adaptation to an eyeglass frame (2); and adapting the prescription lens (14) in such a manner to the eyeglass frame (2) that the middle axis (M) of the raw lens (10) lies outside of the optical center (Z) of the spectacle lens (1).

2. The method according to claim 1, characterized in that the back side (12) of the raw lens (10) is shaped in such a manner that the back side (12) is spherical or aspherical.

3. The method according to claim 1, characterized in that the back side (12) of the raw lens (10) is shaped in such a manner that the back side (12) is concave and rotationally symmetric, and a second freeform surface (22) is composed from the middle axis (M) outward by at least two spherical sections with different radii ($R_{LH1}$-$R_{LHn}$) and that the spherical sections of the second freeform surface (22) border each other tangentially in a sphere transition (40).

4. The method according to claim 3, characterized in that the spherical section of the back side (12), that is arranged closer to the middle axis (M), has a greater radius than a spherical section of the back side (12) at a greater distance from the middle axis (M).

5. The method according to claim 1, characterized in that the spherical section of the front side (11), that is arranged closer to the middle axis (M), has a greater radius than a spherical section of the front side (11) at a greater distance from the middle axis (M).

6. The method according to claim 1, characterized in that a smoothing takes place on at least one sphere transition (40) of spherical sections bordering on each other to form a smoothed transition, whereby after the smoothing:

each point on one or both of the front side (11) and the back side (12) can be mathematically differentiated, and the smoothed transition is not spherical and borders tangentially on the spherical sections.

7. The method according to claim 1, characterized in that the front side (11) and the back side (12) are shaped in such a manner to form a multifocal raw lens (10).

8. The method according to claim 1, characterized in that the prescription surface (13) is a concave prescription freeform surface (23).

9. The method according to claim 1, characterized in that the front side (11) and the prescription surface (13) are shaped in such a manner to form, after adaptation of the prescription lens (14) to an eyeglass frame (2), at least one bifocal spectacle lens (1).

10. The method according to claim 1, characterized in that the prescription surface (13) is shaped in such a manner that an eyeglass wearer looks at it vertically in every viewing angle.

11. The method according to claim 1, characterized in that the middle axis (M) of the raw lens (10) lies in a nasal direction (N) of the optical center (Z) of the spectacle lens (1).

12. The method according to claim 1, characterized in that one area of the spectacle lens (1) is arranged at the top (0) and the middle axis (M) of the raw lens (10) lies toward the top (0) from the optical center (Z) of the spectacle lens (1).

13. The method according to claim 1, characterized in that the middle axis (M) is arranged inside the spectacle lens (1).

* * * * *